United States Patent [19]

Sze

[11] 4,318,056
[45] Mar. 2, 1982

[54] EXCIMER LASER WITH FLUOROPOLYMER LINING

[75] Inventor: Robert C. Sze, Santa Fe, N. Mex.

[73] Assignee: The United States of America as represented by the United States Department of Energy, Washington, D.C.

[21] Appl. No.: 934,763

[22] Filed: Aug. 17, 1978

[51] Int. Cl.³ .................. H01S 3/03; H01S 3/223
[52] U.S. Cl. .................... 372/57; 206/524.3; 206/524.5; 220/426; 330/4.3; 372/61
[58] Field of Search ............ 331/94.5 G, 94.5 D; 220/426, 3, 2.1 R, 82 R; 206/0.6, 524.3, 524.5

[56] References Cited

U.S. PATENT DOCUMENTS

| | | | |
|---|---|---|---|
| 3,135,420 | 6/1964 | Farell et al. | 220/426 |
| 3,272,373 | 9/1966 | Alleaume et al. | 220/426 |
| 3,921,098 | 11/1975 | Hoag | 331/94.5 G |
| 4,105,061 | 8/1978 | Tunnicliffe | 220/426 |

OTHER PUBLICATIONS

Loree et al., "Operating Parameters . . . KrF, ArF, and XeF Lasers", 1977 Conf. on Laser Engineering & Applications, Digest of Technical Papers, pp. 62-63, (6-1977).
Morrison & Boyd, *Organic Chemistry*, 3rd Ed., (Allyn & Bacon, Boston, 1973), p. 1030.
*Scientific American*, Jun. 1974, pp. 122-126.

*Primary Examiner*—William D. Larkins
*Attorney, Agent, or Firm*—William W. Cochran, II; Paul D. Gaetjens; James E. Denney

[57] ABSTRACT

A cavity formed of Teflon to provide extended static fill lifetimes for gases containing halogens. A double cavity configuration provides structural integrity to the inner Teflon cavity by maintaining an identical multi-atmospheric pressure within the outer structural cavity to minimize tension on the Teflon inner cavity. Use of a quantity of the lasing gas in the outer cavity or a constituent of that gas minimizes contamination of the lasing gas.

1 Claim, 3 Drawing Figures

EXCIMER LASER WITH FLUOROPOLYMER LINING

BACKGROUND OF THE INVENTION

The present invention pertains generally to lasers and more particularly to multi-atmospheric halogen compatible cavities.

Halogens, such as Fl, Br, and Cl, are used extensively in excimer lasers. These halogens react with most materials used to form laser cavities. As a result, the static fill lifetimes of the excimer laser gases are finite. Additionally, reaction of the halogens with the laser cavity materials causes contamination of the excimer laser gas.

Although Teflon is nonreactive with halogens, it is plagued with weak mechanical strength so that cavities formed from Teflon do not maintain the required structural integrity necessary for operation of the excimer laser, especially when operated under multi-atmospheric conditions. Additionally, the weak mechanical strength of the Teflon material has a tendency to create leakage to and from the lasing cavity, causing loss of the excimer gas as well as contamination from outside sources.

SUMMARY OF THE INVENTION

The present invention overcomes the disadvantages and limitations of the prior art by providing a multi-atmospheric halogen compatible cavity. This is accomplished in accordance with the present invention through the use of a double cavity configuration wherein an outer structural cavity is filled to multi-atmospheric pressure simultaneously with a Teflon inner containment cavity. The outer structural cavity is filled with either the excimer laser gas or a constituent thereof, such as helium or neon. Equalized pressure on the inner and outer surfaces of the inner Teflon containment cavity maintain its structural integrity. By utilizing the excimer laser gas or a constituent thereof, leakage through the Teflon containment cavity prevents contamination.

It is therefore an object of the present invention to provide a multi-atmospheric halogen compatible cavity.

It is also an object of the present invention to provide a multi-atmospheric halogen compatible cavity which has an extended static fill lifetime.

Another object of the present invention is to provide a multi-atmospheric halogen compatible cavity which is capable of maintaining its structural integrity.

Another object of the present invention is to provide a multi-atmospheric halogen compatible cavity with minimum contamination.

Other objects and further scope of the applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing Abstract of the Disclosure is for the purpose of providing a nonlegal brief statement to serve as a searching and scanning tool for scientists, engineers and researchers and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
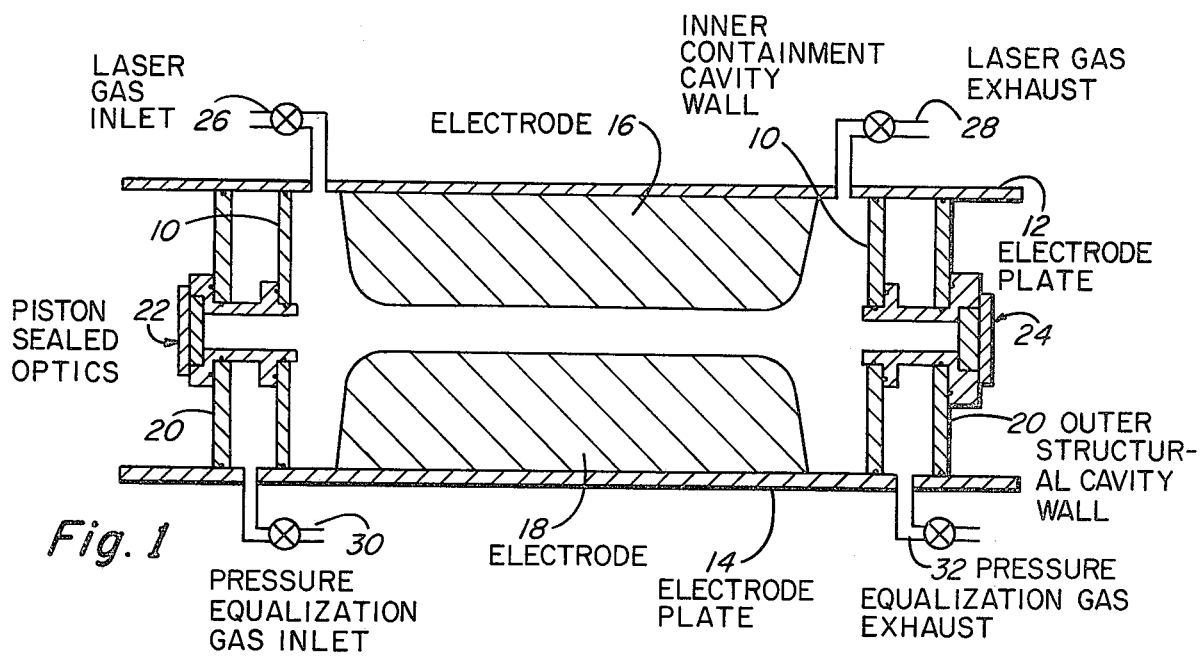
FIG. 1 is a side cutaway view of the preferred embodiment of the invention.

FIG. 1 is a side cutaway view of the device of the preferred embodiment of the invention. An inner containment cavity is formed by inner containment cavity wall 10 which is made of Teflon and electrode plates 12 and 14. Electrodes 16 and 18 are attached to electrode plates 12 and 14, respectively.

Teflon is a trademark for a plastic consisting of a tetrafluoroethylene polymer E. I. duPont de Nemours and Company. It is characterized by outstanding chemical resistance, especially to halogens and halogen compounds with excellent electrical properties and good heat stability. It has no true MP but undergoes a solid phase transition to a gel at 325° C. with a sharp decrease in strength; at about 480° C., it decomposes slowly to a gaseous monomer and some gaseous Fl derivities. It withstands attack from all materials except molten alkali metals; can be boiled in aqua regia, hydrofluoric acid or fuming nitric acid without change in weight or properties; and it also resists the attack of organic materials. It can be successfully employed over a temperature range of $-75°$ C. to $+250°$ C. It can be extruded in the form of rods and tubes or as wire coating; compression moldings of simple articles can be made by using simple techniques; sheets and films are made by shaving baked blocks and cylinders. It can be machined very easily with standard woodworking or metal working tools; and sheet stock can be worked on a punch press.

An outer structural cavity is formed by outer structural cavity wall 20 which is made of a rigid material such as Plexiglas or Kel-F, or other rigid material which is somewhat nonreactive to the halogens in the excimer laser gas.

Kel-F is a trademark for an exceptionally stable, high temperature, nonflammable thermo-plastic material produced by M. W. Kellogg Company. Chemically, it is a polymer of trifluorochloroethylene. In its natural state it is colorless although it can be blended with solid fillers and coloring agents when desired. It possesses excellent chemical resistance, high electrical resistance, good fabricating characteristics and exceptional resistance to wetting by water.

Plexiglas is a trademark for an acrylic resin thermoplastic, colorless material produced by Rohm & Haas Company. Plexiglas is odorless and tasteless, is inert to many chemicals and has excellent electrical properties.

At each end of the Teflon cavity, piston sealed optics 22 and 24 provide an optical cavity for the laser system. Laser gas inlet and exhaust ports 26 and 28 supply the excimer laser gas to the lasing cavity at a preselected multi-atmospheric pressure. Pressure equalization gas inlet and exhaust ports 30 and 32 provide a preselected gas, such as, the excimer laser gas, or a constituent thereof, to the outer structural cavity for pressure equalization.

In operation, the inner containment cavity is pressurized with the excimer laser gas via laser gas inlet and exhaust ports 26 and 28, simultaneously with a pressure equalization gas in the outer structural cavity via inlet and exhaust ports 30 and 32. The pressure equalization gas used in the outer structural cavity is the excimer laser gas or some constituent thereof, such as He or Ne, so that leaks through the Teflon inner cavity will not contaminate the excimer laser gas. By maintaining an equalized pressure on the Teflon inner containment cavity walls, stress to the cavity walls is minimized, so as to reduce bending or stretching which would affect the structural integrity of the inner containment cavity.

Figure 2:
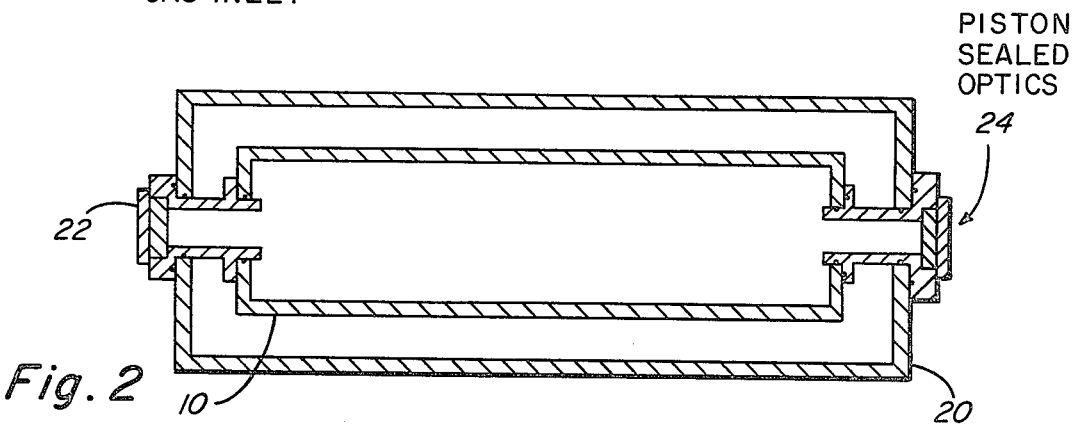
FIG. 2 is a top cutaway view of the preferred embodiment of the invention.

FIG. 2 is a top sectional view of the device of the preferred embodiment. Both the inner containment cavity and outer structural cavity are O-ring sealed to electrodes 16 and 18. FIG. 2 further illustrates the manner in which piston sealed optics 22 and 24 penetrate and seal the inner and outer cavity walls.

Figure 3:
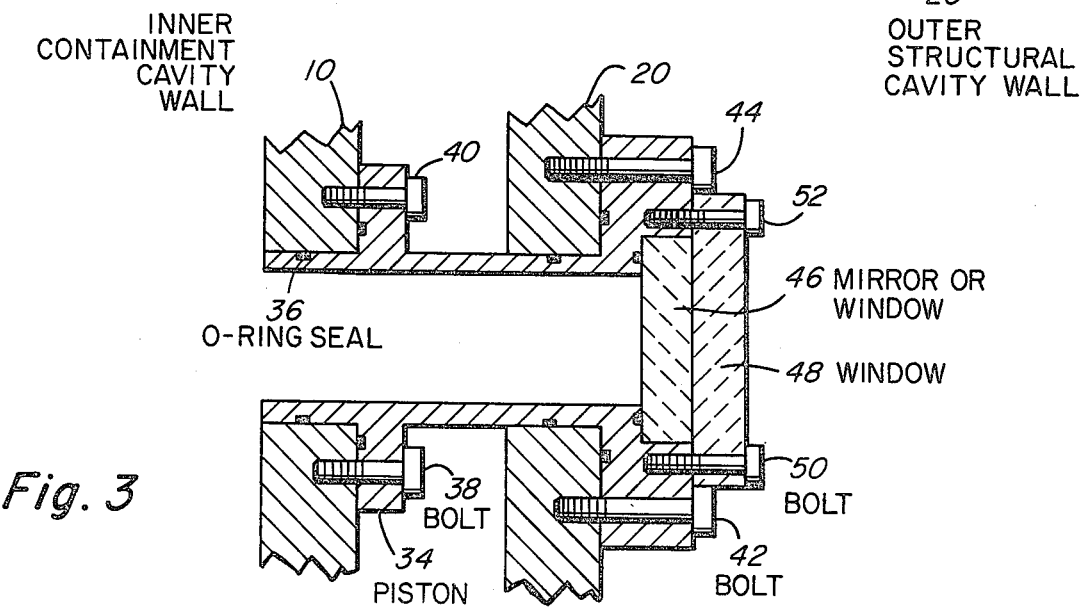
FIG. 3 is a close-up view of the piston sealed optics.

FIG. 3 is a close-up sectional diagram of the piston optics. The piston body 34 is formed from a material which reacts slowly to halogens such as Plexiglas or Kel-F, as described infra. Piston body 34 is inserted through the inner and outer cavity walls 10 and 20.

A series of O-ring seals 36 formed in piston body 34, prevent leakage from the cavities. Teflon bolts 38 and 40 secure the piston to the inner cavity wall 10. Bolts 42 and 44 which are made from a stronger material, seal the piston to the outer cavity wall 20, while optics 46 and 48 are secured to the piston via bolts 50 and 52. Element 46 constitutes either a mirror or window, depending on the utilization of the cavity. Window 48 secures element 46 to the piston walls.

The advantage of the piston sealed optics, as shown in FIG. 3, is that they can be easily removed by loosening the bolts attached to the cavity walls. Additionally, the O-ring seals 36 form an effective seal to prevent loss or contamination of the gases utilized in the cavities. Also, bolts 38 and 40 can be eliminated so that the piston sealed optics can be secured and removed from the cavity walls externally via bolts 42 and 44.

The present device, therefore, provides a cavity having Teflon walls which maintain their structural integrity at multi-atmospheric pressures due to the application of a pressure equalization gas within an outer structural cavity. The structural integrity of the Teflon inner containment cavity minimizes leakage and contamination of the excimer laser gas as well as extending the static fill lifetime of the laser gas, due to the nonreactive nature of Teflon with halogens. The piston sealed optics provide an easily removeable optical system which is capable of sealing the cavities sufficiently to prevent contamination and leakage.

Obviously, many modifications and variations of the present invention are possible in light of the above teachings. For example, various materials can be used for the outer structural cavity walls which are nonreactive or slowly reactive with the excimer laser gas, other than those enumerated above. In addition, Teflon, G-10 fiberglass, or quartz could be utilized as electrode materials, flashboard materials or spark plug materials within the inner containment cavity to further increase static fill lifetime. It is therefore to be understood that within the scope of the amended claims the invention may be practiced otherwise than as specifically described.

What is claimed is:

1. In an excimer laser, a multi-atmospheric halogen compatible cavity structure comprising:
   a rigid outer supporting structure which is substantially nonreactive to gases containing halogens;
   an inner containment cavity constructed of a tetrafluoroethylene polymer disposed within said rigid outer supporting structure;
   an excimer laser gas including halogen gas contained within said rigid outer supporting structure and said inner containment cavity at a single predetermined multi-atmospheric pressure to maintain pressure equalization of said inner containment cavity and thereby maintain structural integrity of said inner containment cavity and minimize contamination of said excimer laser gas resulting from permeation of said excimer laser gas through said inner containment cavity.

* * * * *